United States Patent
Demidov

(10) Patent No.: US 11,886,949 B2
(45) Date of Patent: Jan. 30, 2024

(54) RADIO FREQUENCY IDENTIFICATION FLAT SHEET

(71) Applicant: RFID PAPER SDN BHD, Johor (MY)

(72) Inventor: Ivan Sergeevich Demidov, Zelenograd (RU)

(73) Assignee: RFID PAPER SDN BHD, Johor Bahru (MY)

( * ) Notice: Subject to any disclaimer, the term of this patent is extended or adjusted under 35 U.S.C. 154(b) by 16 days.

(21) Appl. No.: 17/618,266

(22) PCT Filed: Sep. 20, 2019

(86) PCT No.: PCT/RU2019/000658
§ 371 (c)(1),
(2) Date: Dec. 10, 2021

(87) PCT Pub. No.: WO2020/251393
PCT Pub. Date: Dec. 17, 2020

(65) Prior Publication Data
US 2022/0309309 A1    Sep. 29, 2022

(30) Foreign Application Priority Data
Jun. 14, 2019  (RU) .......................... RU2019118570

(51) Int. Cl.
*G06K 19/077* (2006.01)
*B32B 29/00* (2006.01)
*B32B 38/00* (2006.01)
*G06K 19/02* (2006.01)
*G06K 19/07* (2006.01)

(52) U.S. Cl.
CPC ...... *G06K 19/07722* (2013.01); *B32B 29/002* (2013.01); *B32B 38/0004* (2013.01); *G06K 19/025* (2013.01); *G06K 19/0723* (2013.01); *G06K 19/07705* (2013.01); *G06K 19/07775* (2013.01); *B32B 2519/02* (2013.01)

(58) Field of Classification Search
CPC ............ G06K 19/07722; B32B 29/002; B32B 38/0004
USPC ...................................................... 235/488
See application file for complete search history.

(56) References Cited

U.S. PATENT DOCUMENTS

| | | | |
|---|---|---|---|
| 11,176,850 B2 * | 11/2021 | Flynn | G09F 3/0288 |
| 2003/0049403 A1 * | 3/2003 | Crum | B42D 15/0093 |
| | | | 428/138 |

(Continued)

FOREIGN PATENT DOCUMENTS

| | | |
|---|---|---|
| JP | S5736365 A | 2/1982 |
| JP | 2013109434 A | 6/2013 |

(Continued)

*Primary Examiner* — Allyson N Trail
(74) *Attorney, Agent, or Firm* — Maschoff Brennan

(57) ABSTRACT

The invention relates to the field of radio frequency identification, in particular, to the one containing a radio frequency tag in printing paper for typographical printing. The technical result is the creation of the technical solution as an alternative to the known one. The sheet material with the radio frequency identification is characterized in by the fact that it is made in the form of a rectangular sheet with a layer for printing, a length of 480 mm and a width of 325 mm, and it contains an antenna and a chip placed inside the sheet, what's more one of the sheet angles is made with a 45° bevel and a length of 10 mm.

20 Claims, 3 Drawing Sheets

(56) References Cited

U.S. PATENT DOCUMENTS

Figure 1:
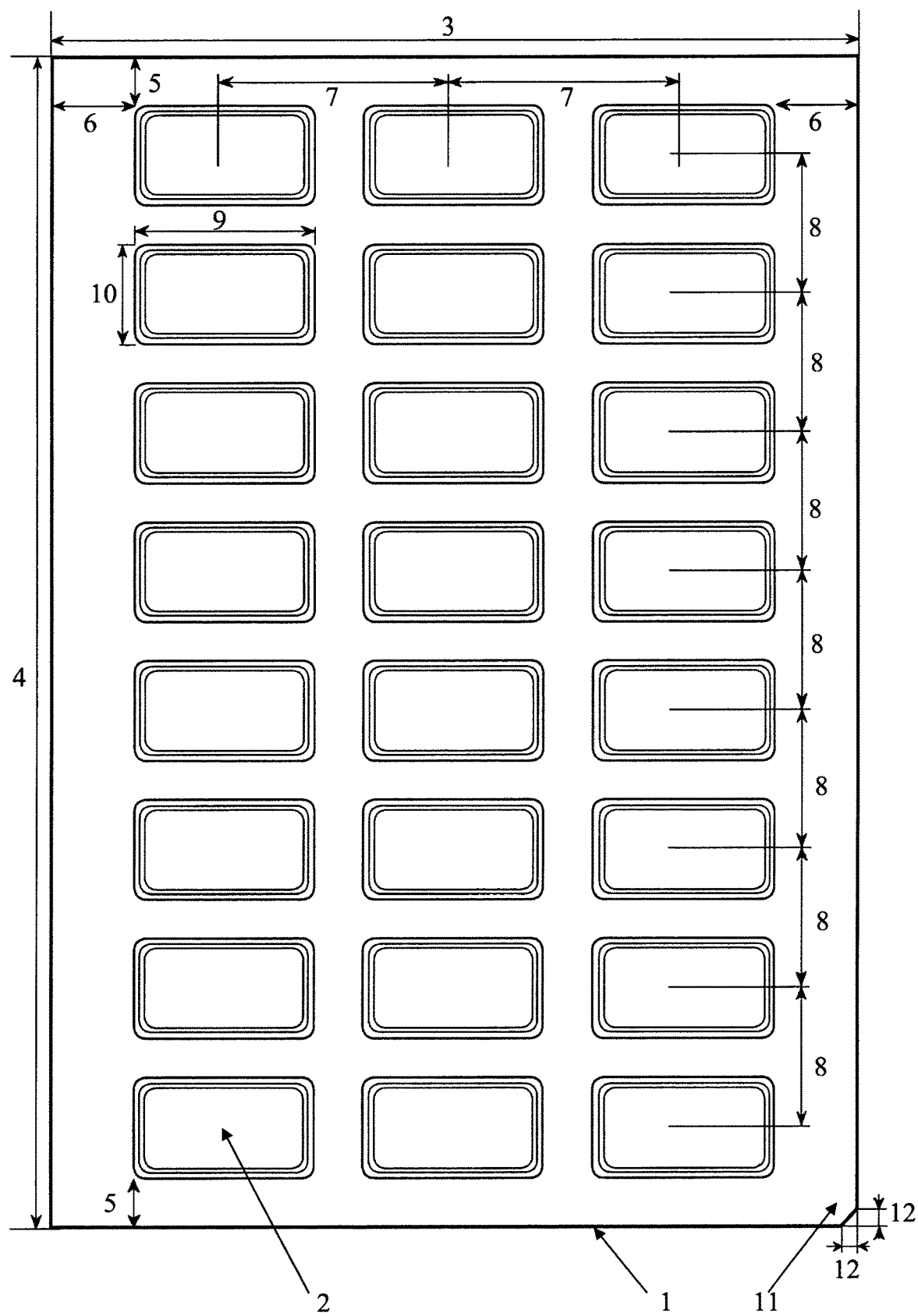

| | | | |
|---|---|---|---|
| 2011/0260400 A1* | 10/2011 | Harrison | A63F 3/04 |
| | | | 273/287 |
| 2012/0067962 A1 | 3/2012 | McDonald | |
| 2012/0297609 A1 | 11/2012 | Green et al. | |
| 2018/0137787 A1* | 5/2018 | Utz | C09J 7/403 |
| 2022/0309310 A1* | 9/2022 | Demidov | B42D 25/455 |

FOREIGN PATENT DOCUMENTS

| | | |
|---|---|---|
| RU | 2607725 C1 | 1/2017 |
| WO | 2013101654 A1 | 7/2013 |

* cited by examiner

RADIO FREQUENCY IDENTIFICATION FLAT SHEET

The invention relates to the field of radio frequency identification, in particular, to materials containing radiofrequency labels in their layers and intended for printing and stamping by commonly available printing methods.

The following terms and abbreviations will be used hereinafter.

Radio frequency identification (abbr. RFID) is a method of transmitting wireless information in which the data stored in so-called transponders or RFID tags by means of radio signals are read or written. Generally, the RFID tags are passive, in other words, they do not include batteries.

Chip—an integrated (micro)circuit is a microelectronic device with input resistances and/or building networks made of the semiconductor plate. The chip processes signals when receiving and transmitting information by means of the radio frequency communication with a reader. The processor contains a protected memory, user memory, a unique identification number. The processor may contain a processor for cryptography processing, programmable space to run microprograms, etc.

The antenna is a conductor configuration, which geometrically and technically is made in accordance with the type of chip used. The antenna can be closed (HF range) and open type (UHF range). The antenna comes in different shapes: the circle, oval, square, rectangle, and other free geometric shapes. The antenna's shape is designed in accordance with the specification of the chip used. The antenna is made of materials containing conductive substances, such as aluminum, copper, silver, tin, gold, graphite, and other materials. The antenna is to be applied on the substrate made of thin-film, synthetic materials, and paper by etching, silk screen printing (screen printing), thermal transfer, stamping, inkjet, offset, as well as flexographic and digital printing with special inks.

The RFID inlay is a part of the RFID product that consists of the substrate and contains at least one chip and one antenna. The location of the antennas and chips can be either synchronous relative to the sides of the sheet material with the radiofrequency tag or asynchronous, depending on the intended design and configuration of the future RFID product. The additional components can be located on the inlay, for example, capacitors, resistors, sensors, microcontrollers, etc.

The RFID tag is a combination of the chip and antenna.

The RFID product is a final product, containing an RFID tag, for example, a card, tag, label, sticker, packaging, bracelet, or other forms of the product that can be obtained by cutting it from the sheet of RFID material that includes an RFID inlay.

The RFID reader is a device designed to exchange data with RFID products, for example, information reading and writing.

The closest analog of the invention is a sheet material with radio frequency identification, known from JP 5916028 patent, which is a paper of standardized sizes formats A0-A10, B0-B10, as well as Japanese paper size formats (JIS).

The expansion of the sheet materials arsenal is a technical problem which the invention aimed to solve.

The technical result is the creation of a technical solution as an alternative to the known solution.

The claimed technical solution makes it possible to produce a sheet material suitable for commercial printing with a sheet feed, including the modern digital presses HP Indigo, Canon ImagePress, Konica Minolta AccurioPRESS, Ricoh Pro, Xerox iGen 5, and others.

The claimed technical result is achieved due to the fact that the sheet material with radio frequency identification is made in the form of the rectangular sheet with a layer for printing, with a length of 480 mm and a width of 325 mm, it contains an antenna and a chip located inside the sheet, furthermore, one of the sheet angles is has a 45° bevel and has a size of 10 mm.

Figure 2:
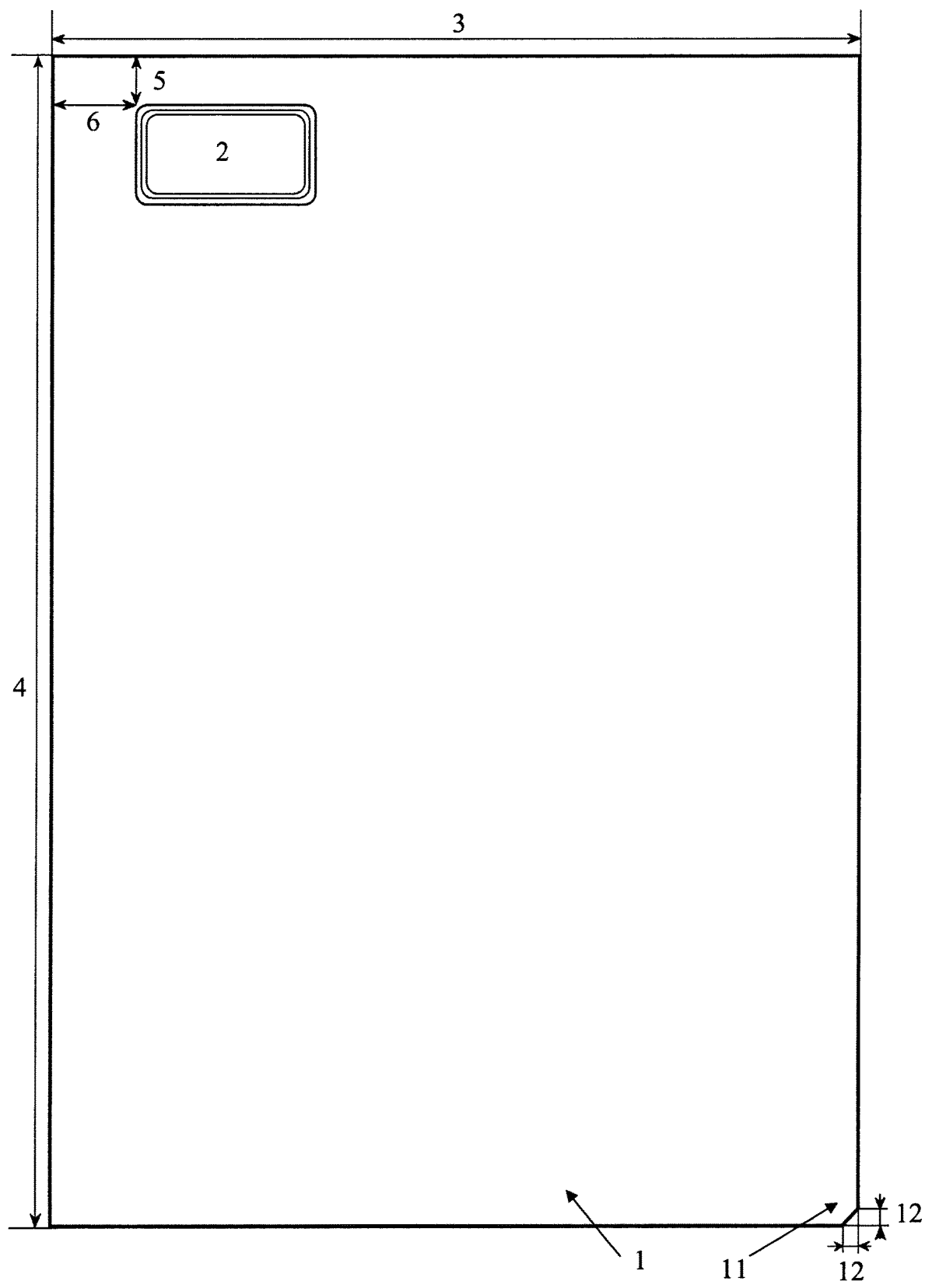
Figure 3:
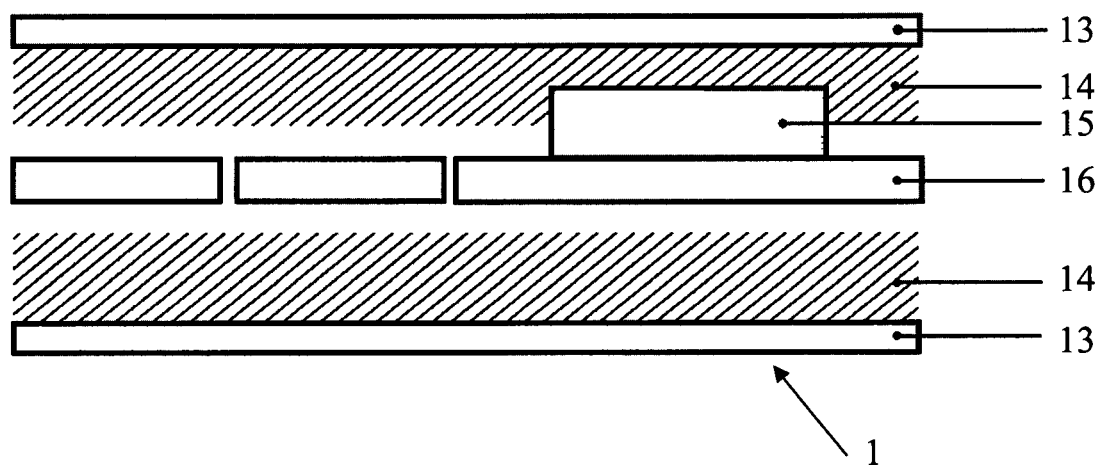

The invention is explained using FIG. 1-3, which shows:

FIG. 1 is a general view of sheet material with twenty-four radio frequency tags;

FIG. 2—general view of the sheet material with one radio frequency tag;

FIG. 3—layer material sectional view.

POSITIONS 1-16 ARE SHOWN IN FIG. 1-3

1—sheet material;
2—the place of the radio frequency identification tag (RFID tag);
3—the smaller side of the sheet;
4—the larger side of the sheet;
5—the distance from the smaller side of the sheet to the antenna;
6—the distance from the large side of the sheet to the antenna;
7—the distance between the centers of the adjacent antennas located horizontally;
8—the distance between the centers of the adjacent vertically located antennas;
9—antenna length;
10—antenna width;
11—position angle;
12—beveled angle size;
13—printing layer;
14—synthetic plastic adhesive layer;
15—chip;
16—antenna.

The sheet material with radio frequency identification is made in the form of rectangular sheet 1 with a length of 480 mm—the larger side of sheet 4—and a width of 325 mm—the smaller side of sheet 3.

The positional angle 11 is made with a 45° bevel with a size of 10 mm and ensures the correct location of the sheet at various stages of the final product's manufacturing by the printing plants: typing, stamping, and die-cutting. Position angle 11, in contrast to the graphically plotted angle, is more convenient and universal, as it allows to check the correct location of the sheet in the middle of the stack.

The device is a sandwich structure (FIG. 3), in which the first layer for printing 13, the layer of synthetic plastic adhesive 14, the chip 15 (not shown in FIG. 1), the layer with the antenna 16 on the substrate, the second layer of the synthetic plastic adhesive composition 14, the second layer for printing 13.

Printing layer 13 can be made of offset, craft or recycled paper, cardboard, synthetic paper such as PET (Polyethylene terephthalate), PVC (Polyvinyl chloride), PP (Polypropylene), PE (Polyethylene), natural or synthetic fabric, the artificial leather on the basis of PVC (Polyvinyl chloride) or PU (Polyurethane), or the layer of another suitable material. The sheet material can be either white or painted in any color; have markings, patterns or inscriptions; have a textured surface or additional coating, including a primer, which provides better retention of paint on the surface.

The substrate where antenna 16 and chip 15 are located can be made, for example, of PET, special paper, or another suitable flexible material.

Antenna 16 can be made by means of etching or aluminum sputtering, alloys based on copper, silver, tin, gold, graphite, or other conductive materials suitable for chip 15's operation.

MIFARE Ultralight C, MIFARE Ultralight EV1, MIFARE Ultralight Nano, NTAG 215, NTAG DNA, ICODE SLIX 2, UCODE 8, UCODE DNA, and others can be used as chip 15.

As such, antenna 16 and chip 15 are placed inside sheet 1.

Antenna 16, in this particular case, is made in a rectangular shape with a length of 72 mm and a width of 41 mm. What's more, in the example in FIG. 1, the distance from the smaller side of the sheet to the edge of the antenna 16 is 20 mm, the distance from the larger side of the sheet to the edge of the antenna 16 is 34 mm.

Antenna 16 can be made as a round shape and has a radius of 15-60 mm, as well as a square shape with a side length of 15-60 mm or any other suitable shape.

Depending on the purpose, more than one antenna 16 with a chip 15 can be located in the sheet. Twenty-four RFID tags, which respectively comprise twenty-four antennas 16 on the substrate, are shown in FIG. 1. In this case, the distance between the centers of the adjacent horizontally located antennas 16 is 92.5 mm, and the distance between the centers of adjacent vertically arranged antennas is 57 mm.

In general, there can be from 1 to 150 RFID tags, for example, 1, 2, 4, 8, 16, 24, 25, 36, 48, 50, 72, while the positioning and geometry of the antennas and chips are determined by the future shape of the final product.

LEDs, sensors, transducers, thin-film batteries, and other electronic components can also be placed inside sheet 1.

Positional elements can be located inside the sheet, whereby the induction sensors find the location of the RFID tags for positioning the sheet during printing, cutting, or other necessary operations in punching and other printing machines. The resulting sheet thickness varies from 0.15 mm to 1.0 mm.

The machine-readable unique sheet number can be applied on each sheet, for example, the barcode, QR code, and other graphic elements. The tags located on the RFID sheet are linked by this number. When forming a print file, the unique numbers of RFID tags located inside the sheet material are known to the printing house in advance, which makes it possible to print this information in one pass, thereby avoiding additional manipulations for reading data from RFID tags and their subsequent additional application of graphics to RFID products.

After printing, the sheet material with radio frequency identification can be further processed, for example, partial foil stamping, varnishing, application of laminating films based on BOPP (biaxially oriented polypropylene film), PVC, PET.

The sheet material with radio frequency identification can have a front and back side made of one or different grades and colors of paper, or contain the paper on one side and synthetic material on the other side, fabric, or have a siliconized layer on one side and other combinations, including those containing the metallized layers, magnetic layers, and other materials.

The sheet material is used as follows.

The sheet material is to be placed in the equipment for printing images. The bevel of one of the angles is necessary for the sheet material positioning when printing. The sheet material is placed in the machine for subsequent high-precision cutting of products of various shapes or other processing (folding, embossing, embossing, etc.) after printing.

The claimed sheet material can be used to produce classic paper cards with an RFID tag: transport cards, key cards (Skipass, hotel, office), parking cards, labels, tags, postcards, packages, stickers, and other similar products containing the RFID tag inside.

The invention claimed is:

1. A sheet material for radio frequency identification (RFID), comprising:
   a rectangular sheet having a length of 480 mm and a width of 325 mm, the rectangular sheet comprising a printing layer; and
   an antenna and a chip placed inside the rectangular sheet;
   wherein a bevel having a 45° angle and a length of 10 mm is formed on one corner of the rectangular sheet.

2. The sheet material of claim 1, wherein the printing layer is based on paper material.

3. The sheet material of claim 1, wherein the sheet material includes more than one antenna and more than one corresponding chip.

4. The sheet material of claim 1, wherein the sheet material includes one or more additional electronic components.

5. The sheet material of claim 4, wherein the one or more additional electronic components are selected from light emitting diodes (LEDs), sensors, transducers, thin-film batteries, capacitors, resistors, microcontrollers, and any combination thereof.

6. The sheet material of claim 1, wherein the bevel formed on the one corner of the rectangular sheet is configured to allow locating the sheet material in at least one stage of manufacturing of an RFID product.

7. The sheet material of claim 6, wherein the RFID product is selected from a card, a tag, a label, a sticker, a packaging and a bracelet.

8. The sheet material of claim 1, wherein the printing layer is made of material selected from offset paper, craft paper, recycled paper, cardboard, synthetic paper, Polyethylene terephthalate, Polyvinyl chloride, Polypropylene, Polyethylene, natural fabric, synthetic fabric, and a combination thereof.

9. The sheet material of claim 1, wherein the sheet material is formed in a sandwich structure, comprising:
   the printing layer;
   a first layer of synthetic plastic adhesive on top of the printing layer;
   an antenna layer on top of the first layer of synthetic plastic adhesive, the antenna layer comprising the antenna, the chip being mounted on the antenna;
   a second layer of synthetic plastic adhesive on top of the antenna layer, the second layer of synthetic plastic adhesive encapsulating the chip; and
   a second printing layer on top of the second layer of synthetic plastic adhesive.

10. The sheet material of claim 1, wherein a RFID product manufactured from the sheet material includes the chip and more than one antenna.

11. The sheet material of claim 1, wherein a plurality of RFID products are manufactured from the sheet material, each RFID product including the chip and at least one antenna.

12. The sheet material of claim 1, further comprising a plurality of positional elements located inside the rectangular sheet, the plurality of positional elements being usable for locating a plurality of RFID products during an operation selected from printing, cutting and punching of the sheet material.

13. The sheet material of claim 12, wherein a thickness of the sheet material varies between 0.15 mm and 1.0 mm according to locations of the plurality of positional elements.

14. The sheet material of claim 1, wherein a machine-readable bar code, QR code or graphic element is printed on the sheet material.

15. The sheet material of claim 14, wherein one or more RFID products manufactured from the sheet material are identified by the machine-readable bar code, QR code or graphic element.

16. The sheet material of claim 1, wherein the sheet material is further processed, after printing, by partial foil stamping, varnishing, or application of at least one laminating film.

17. A method for manufacturing an RFID product, comprising:
mounting a rectangular sheet into a printer, a bevel formed on one corner of the rectangular sheet being used for proper positioning of the rectangular sheet in the printer, wherein the rectangular sheet has a length of 480 mm and a width of 325 mm, wherein the bevel has a 45° angle and a length of 10 mm, and wherein the rectangular sheet comprises:
a printing layer,
an antenna, and
a chip.

18. The method of claim 17, wherein the rectangular sheet comprises:
a first layer of synthetic plastic adhesive on top of the printing layer;
an antenna layer on top of the first layer of synthetic plastic adhesive, the antenna layer comprising the antenna, the chip being mounted on the antenna;
a second layer of synthetic plastic adhesive on top of the antenna layer, the second layer of synthetic plastic adhesive encapsulating the chip; and
a second printing layer on top of the second layer of synthetic plastic adhesive.

19. The method of claim 17, wherein the rectangular sheet further comprises a light emitting diode (LED), a sensor, a transducer, a battery, a capacitor, a resistor, or a microcontroller.

20. The method of claim 17, wherein the rectangular sheet comprises one or more positional elements, and wherein the method further comprises printing, cutting, or punching the RFID product using the one or more positional elements.

* * * * *